United States Patent

Ratlieff, Jr.

[11] Patent Number: 6,067,923
[45] Date of Patent: May 30, 2000

[54] TURBULENT STABILIZING VENTURI SYSTEM

[76] Inventor: William D. Ratlieff, Jr., 11527 SW. 56 CT., Cooper City, Fla. 33330

[21] Appl. No.: 09/111,842

[22] Filed: Jul. 8, 1998

[51] Int. Cl.[7] .................................................. B63B 1/20
[52] U.S. Cl. ............................................ 114/290; 114/289
[58] Field of Search ............................ 114/271, 288, 114/289, 290; D12/310, 312

[56] References Cited

U.S. PATENT DOCUMENTS

| | | | |
|---|---|---|---|
| D. 217,032 | 3/1970 | Batham et al. | D71/1 |
| D. 217,033 | 3/1970 | Batham et al. | D71/1 |
| D. 217,034 | 3/1970 | Batham et al. | D71/1 |
| D. 267,866 | 2/1983 | Parsons | D12/311 |
| D. 302,969 | 8/1989 | Pipkorn | D12/314 |
| D. 310,656 | 9/1990 | Paine, Jr. | D12/300 |
| D. 336,887 | 6/1993 | Granie et al. | D12/310 |
| D. 348,039 | 6/1994 | Kline | D12/314 |
| D. 378,507 | 3/1997 | Schafer et al. | D12/316 |
| D. 382,850 | 8/1997 | Schmidt | D12/310 |
| 3,075,488 | 1/1963 | Wolfe et al. | 114/288 |
| 3,126,856 | 3/1964 | Fuller | 114/290 |
| 3,137,261 | 6/1964 | Noe | 114/66.5 |
| 3,316,874 | 5/1967 | Canazzi | 114/67 |
| 3,361,104 | 1/1968 | Glass | 114/66.5 |
| 3,902,445 | 9/1975 | Stolk | 114/289 |
| 4,004,534 | 1/1977 | Allison | 114/274 |
| 4,091,761 | 5/1978 | Fehn | 114/290 |
| 4,348,972 | 9/1982 | Parsons | 114/61 |
| 4,890,564 | 1/1990 | Burg | 114/67 |
| 5,178,085 | 1/1993 | Hsu | 114/61 |
| 5,211,126 | 5/1993 | Johnson | 114/61 |
| 5,611,295 | 3/1997 | Stables | 114/126 |

*Primary Examiner*—Sherman Basinger
*Attorney, Agent, or Firm*—Brian S. Steinberger; Law Offices of Brian S. Steinberger

[57] ABSTRACT

A hull configuration for the planar surface region in the tunnel area between hulls(pontoons) in a fishing type catamaran. In the tunnel bottom surface is a raised frontwardly located center section adjacent the bow forms a venturi where low pressure is formed by incoming waves passing about the squared off rear portion of the center section. Behind the center section is a raised longitudinal stabilizer running to the rear(stern) of the boat which diverts and splits incoming air coming from the bow section to each side of the tunnel. Adjacent to the center section are two raised side stabilizers which straighten out incoming air and reduce the turbulence effects therefrom. On the rear ends of the two side stabilizers and the center section are through-holes that allow for venting excessive pressure from inside the tunnel to the interior of the bilge of the boat. Keel pads on the bottom of each pontoon hull each have exterior raised ridges (interior of lifting strokes) along the front portion flush to a rear portion surface. The keel pads give an extra planar surface for lifting the boat from the water.

6 Claims, 7 Drawing Sheets

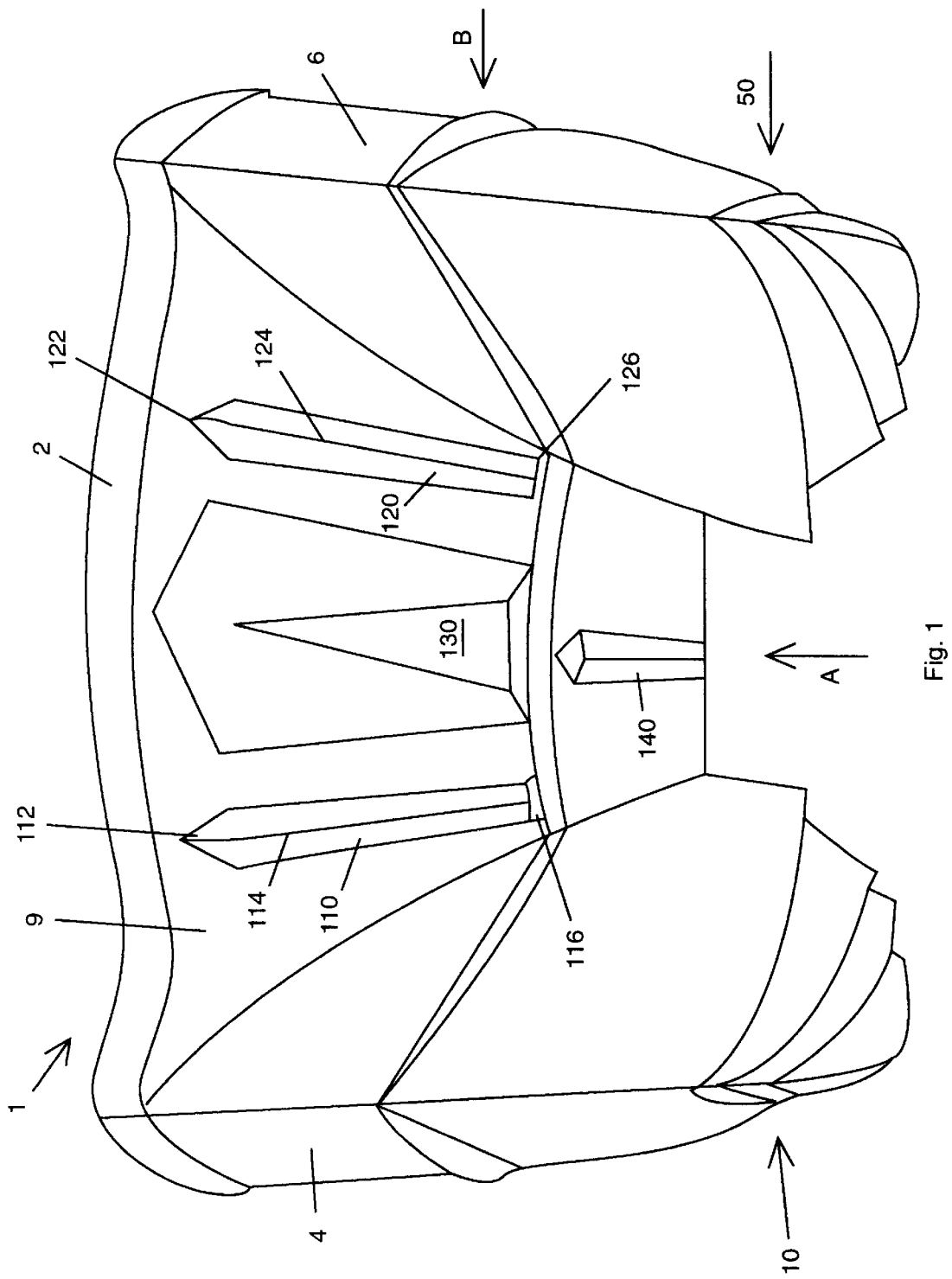

TURBULENT STABILIZING VENTURI SYSTEM

This invention relates to water craft hull-forms, and in particular to a keel pad and tunnel hull surface configurations in dual hull pontoon boats for eliminating wave splashing effects (i.e. tunnel sneeze) and wave pounding effects (i.e. sneeze) caused by in-coming waves passing through the tunnel between the boat hulls.

BACKGROUND AND PRIOR ART

Multi-hull boats such as twin hull catamarans, triple pontoon type hulls, and the like, have become increasingly popular over the last two decades. Multi-hulls have various benefits over conventional mono-hull boat designs such as having the air flowing through the tunnel between the pontoon portions which gives the boat lift off the water as the boat rides over the water surface. A popular type of multi-hull boat is the fishing boat catamaran, in which a 20 to 30 foot dual hull pontoon boat is powered by a gas or diesel engine. Unlike sport boats, the fishing boat catamaran has a cruising speed of up to approximately 20–30 miles per hour. At these speeds, problems occur when incoming waves entering the tunnel, thus decrease the air flow through the tunnel resulting in a misty spray of water coming over the front of the boat, a condition which has been referred to as tunnel sneeze. Furthermore, these incoming waves passing through the tunnels have been known to cause a pounding action which results in a bumpy ride for the boat passengers, as well as undesirable noise effects. Normally, the sport engine catamarans can overcome this problem by running at higher speeds than 30 mph. However, fishing boats that need to maintain speeds under approximately 20–30 mph continuously suffer from this "tunnel sneeze" condition.

There have been many proposals for hull configurations for multi-hull boats over the years. See for example U.S. Pat. Nos.: Des.217,032, Des. 217,033, and Des. 217,034 to Batham et al.; Des. 267,866 to Parsons; Des. 302,969 to Pipkorn; Des. 310,656 to Paine, Jr.; Des. 336,887 to Granie et al. Des. 348,039 to Kline; Des. 378,507 to Schafer et al.; Des. 382,850 to Schmidt; 3,137,261 to Noe; 3,316,874 to Canazzi; 3,361,104 to Glass; 4,004,534 to Allison; 4,348,972 to Parsons; 4,890,564 to Burg; 5,211,126 to Johnson; 5,611,295 to Stables; and 5,178,085 to Hsu. However, none of the prior art cited above or known to the inventor overcomes the problems with the dual hull catamaran "fishing" boat hull configurations.

SUMMARY OF THE INVENTION

The first objective of the present invention is to provide a hull configuration surface between hulls on a multi-hull boat that allows air passing through the tunnel between the hulls to continue when incoming waves pass through the tunnel.

The second object of this invention is to provide a hull configuration surface in the tunnel between hulls on a multi-hull boat that gives a smoother ride to passengers by reducing pounding bumping wave action caused from in-coming waves passing through the tunnel.

The third object of this invention is to provide a hull configuration surface in the tunnel between hulls on a multi-hull boat that gives a quieter ride to passengers by reducing pounding noises caused from in-coming waves passing through the tunnel.

The fourth object of this invention is to provide a hull configuration surface in the tunnel region between hulls of a multi-hull boat that allows for excessive pressure to be vented from inside the tunnel to the bilge portion of the boat The fifth object of this invention is to provide a combination lifting stroke and keel pad surface for the bottom of the hulls of a multi-hull boat for providing additional planar surface other than the boat bottom, and for lifting the boat out of the water when the boat is running to improve its efficiency and increase the overall speed.

The sixth object of this invention is to provide a hull configuration surface between hulls on a multi-hull boat that reduces turbulence from the incoming air between the hulls, creating laminar flow, thus improving overall flow between the hulls.

Further objects and advantages of this invention will be apparent from the following detailed description of a presently preferred embodiment which is illustrated schematically in the accompanying drawings.

BRIEF DESCRIPTION OF THE FIGURES

FIG. 1 is a perspective view of the novel keel pad and tunnel undersurface hull configuration for a multi-hull boat.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 2A:
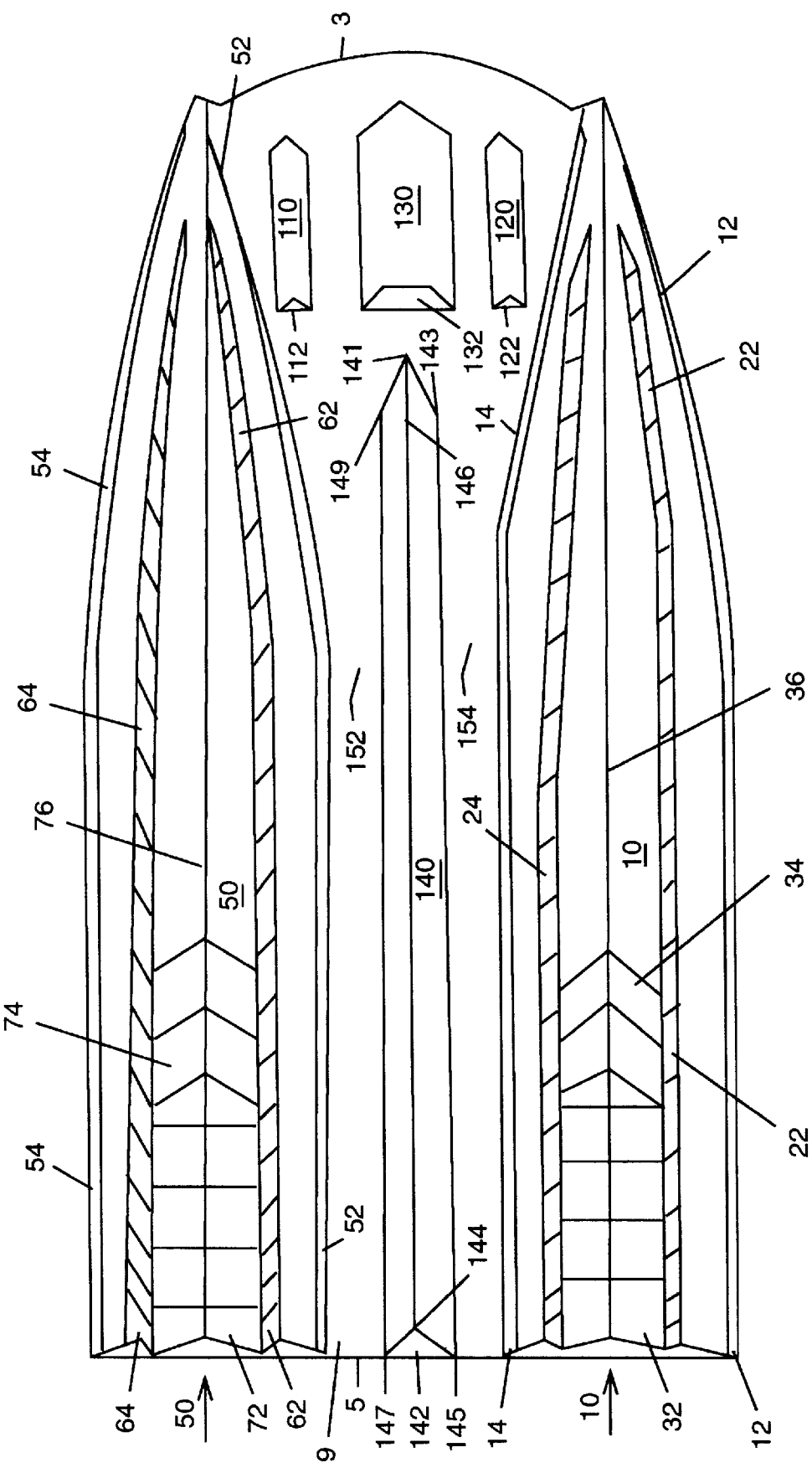
FIG. 2A is a bottom view of the boat hull invention of FIG. 1 along arrow A.
Figure 2B:
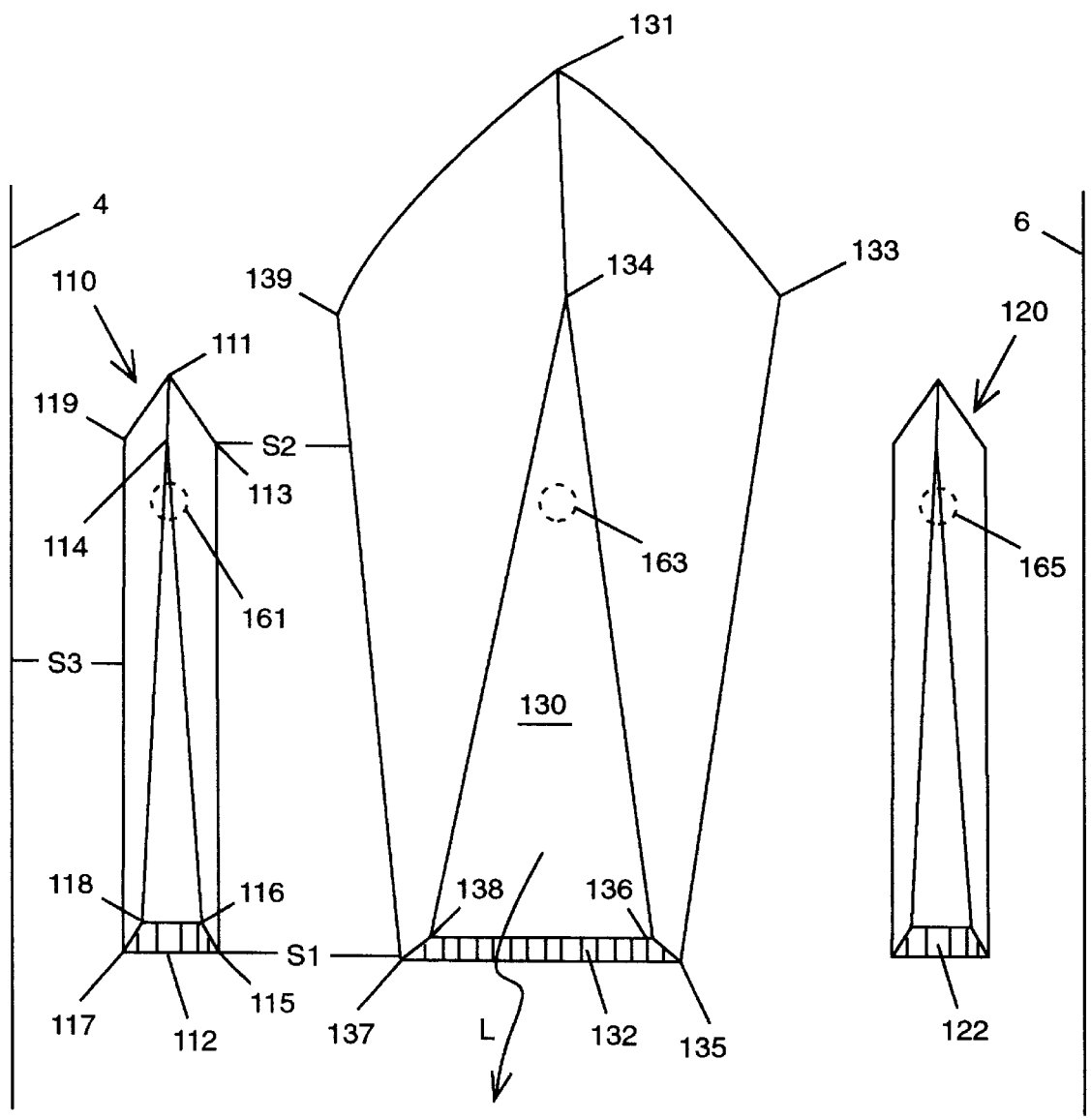
FIG. 2B is an enlarged view of the center section and side turbulence stabilizers of FIG. 2A.
Figure 3:
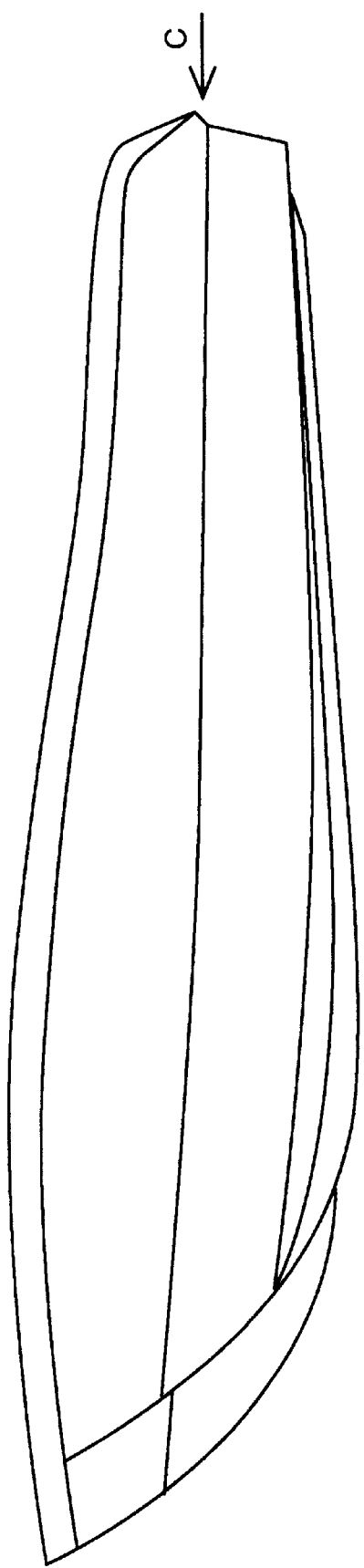
FIG. 3 is a side view of the boat hull invention of FIG. 1 along arrow B.

FIG. 1 is a perspective view 1 of the novel keel pad and tunnel undersurface hull configuration for a multi-hull boat. FIG. 2A is a bottom view of the boat hull invention 1 of FIG. 1 along arrow A. FIG. 2B is an enlarged view of the center section 130 and side turbulence stabilizers 110 and 120 of FIG. 2A. FIG. 3 is a side view of the boat hull invention of FIG. 1 along arrow B. A preferred embodiment of using the novel turbulence venturi stabilizing system will be with an approximately 20 foot long fishing type catamaran 1. Referring to FIGS. 1–3, boat 1 includes a tunnel undersurface 9 between pontoon-hulls 4 and 6. On undersurface 9 includes a center venturi section 130 between two side turbulence stabilizers 110 and 120.

Referring to FIGS. 1, 2A and 2B, center section 130 is generally torpedo shaped having an approximate longitudinal length between tip end 131 and rear 132 being approximately 71 inches. A rounded head portion runs from a front tip end 131 approximately 14 inches to left base 139, and approximately 14 inches between tip 131 and right base 133. The rounded top of head 134 is approximately 13 and ½ inches from both bases 133, and 139, respectively, where the surface width between points 133 and 139 is approximately 18 inches. Rear 132 has a lower surface adjacent width between points 135 and 137 being approximately 11 and ½ inches, with angled sides between points 137 and 138 and between points 135 and 136 each being approximately 4 inches. The upper width between points 136 and 138 being approximately 6 and ½ inches, with the generally triangular surface area between points 134, 136 and 138 being substantially planar. Center section 130 being adjacent to the front-bow section of the boat 1 forms a venturi where low pressure is formed by incoming waves in the direction of arrow L passing over the squared off rear 132. On both sides of center venturi section 130 are side turbulence stabilizers 110 and 120.

Referring to FIGS. 1, 2A and 2B, side turbulence stabilizers 110, and 120 are both identical in dimensions and for purposes of brevity will be described in reference to side stabilizer 110. Side stabilizer 110 has a length of approximately 64 inches between rounded tip end 111 and rear 112. Note that rears 112 and 132 of side stabilizers 110 and 120 are aligned on the same plane as that of center section rear 132. The front spacing, S1, between edge 115 of side stabilizer 110 and left rear edge 137 of center section 130 is approximately 3 and ½ inches, while the forward spacing, S2, between point 113 of side stabilizer 110 and side wall(137–139) of center section 130 is narrower at approximately 3 inches. Side stabilizr 110 is spaced a distance S3 from pontoon-hull 4 approximately 7 inches. The rounded head of stabilizer has side edge distances between points 111 and 113 and between points 111 and 119 each being approximately 4 and ½ inches. The squared off rear 112 has a surface base width between points 115 and 117 being approximately 4 and ½ inches, with angled sides between points 117 and 118 and between points 115 and 116 each being approximately 1 and ¼ inches. The upper width between points 116 and 118 being approximately 2 and ¼ inches, with the generally triangular surface area between points 114, 116 and 118 being substantially planar. Note that side stabilizer 120 has similar dimensions. Both side stabilizers 110 and 120 straighten out incoming air passing through the tunnel area.

The longitudinal turbulence stabilizer 140 will be described in reference to FIGS. 1 and 2A. Behind center venturi section 130 is longitudinal turbulence stabilizer 140, having a rounded tip end 141 approximately 6 inches from rear 132 of center section 130. The overall length of stabilizer 140 from tip 141 to rear 144 is approximately 211 and ½ inches. Longitudinal stabilizer 140 has a head with angled sides between points 141 and 149 and between points 141 and 143 each being approximately 12 inches. Stabilizer 140 main body portion is substantially triangular in cross section along the main portion from points 144 to 146 and has a consistent width along its body between points 145 and 147 and between points 143 and 149 each being approximately 7 inches. The triangular rear end wall 142 has sides between points 144 and 147 and between 144 and 145 each being approximately 4 inches and a height between point 144 and surface 9 being approximately 2 inches. In operation, the longitudinal stabilizer 140 runs from behind center venturi section 130 to the rear(stem) 5 of the boat 1. Longitudinal stabilizer 140 diverts and splits in-coming air coming from the bow section to each side 152 and 154 of the tunnel between pontoon-hulls 10 and 50.

Referring to FIG. 2B, the rear ends 112 of first side stabilizer 110, center section 130 and second side stabilizer 120 are open channels that have through-holes passing to interior openings 161, 163 and 165 inside the bilge interior of boat 1 which allow for the venting of excessive pressure formed in the tunnel between pontoon-hulls 10 and 50, which can occur while the boat 1 is running.

Figure 4:
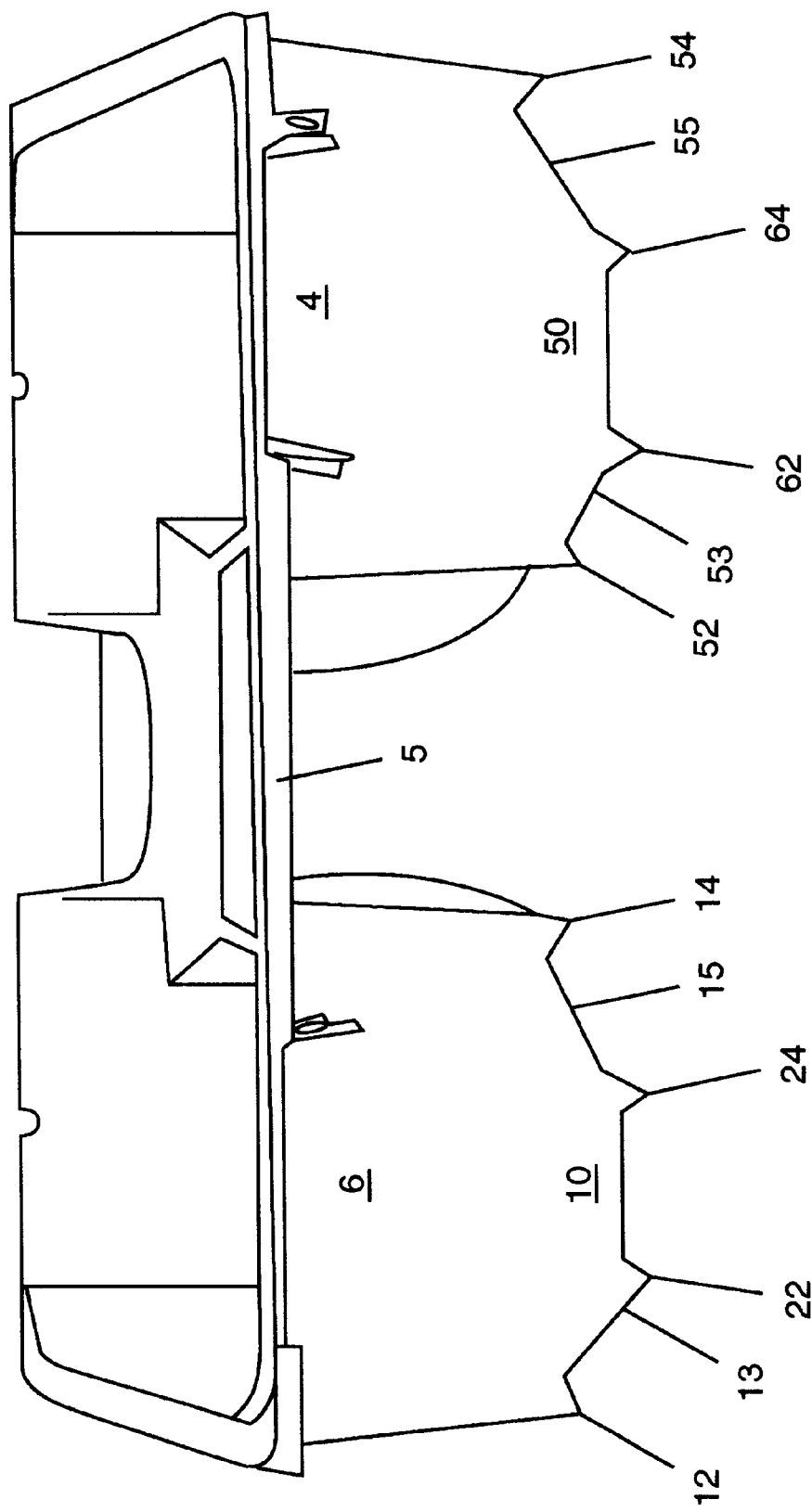
FIG. 4 is a rear view of the boat hull invention of FIG. 3 along arrow C (showing the keel pad).

FIG. 4 is a rear view of the boat hull invention of FIG. 3 along arrow C. Referring to FIGS. 2 and 4, keel pads 10 and 50 are on the bottom surfaces of left pontoon-hull 10, and right pontoon-hull 50, respectively. Left keel pad 10 includes exterior ridges 22,24 interior of lifting strokes running parallel to one another approximately ⅔ of the length from the rear 5 to angling toward each other adjacent to the front 3 portion of the boat 1. A triangle tip portion 36 runs between interior ridges 22, 24 from the front of the boat 3 approximately ⅔ toward a funnel portion 34 which slopes down to a rectangular riding pad portion 32, the latter of which is approximately 1 and ½ inches below interior grooves 13, 15. The exterior of lifting strokes right keel pad 50 includes exterior ridges 62, 64 interior of lifting strokes running parallel to one another approximately ⅔ of the length from the rear 5 to angling toward each other adjacent to the front 3 portion of the boat 1. A triangle tip portion 76 runs between interior ridges 62, 64 lifting strokes from the front of the boat 3 approximately ⅔ toward a funnel portion 74 which slopes down to a rectangular riding pad portion 72, the latter of which is approximately 1 and ½ inches below exterior grooves of exterior of lifting strokes 53, 55. Keel pads 10 and 50 lift boat 1 off the water surface providing a planing surface for boat speed, which reduces drag factors on the boat.

Figure 5:
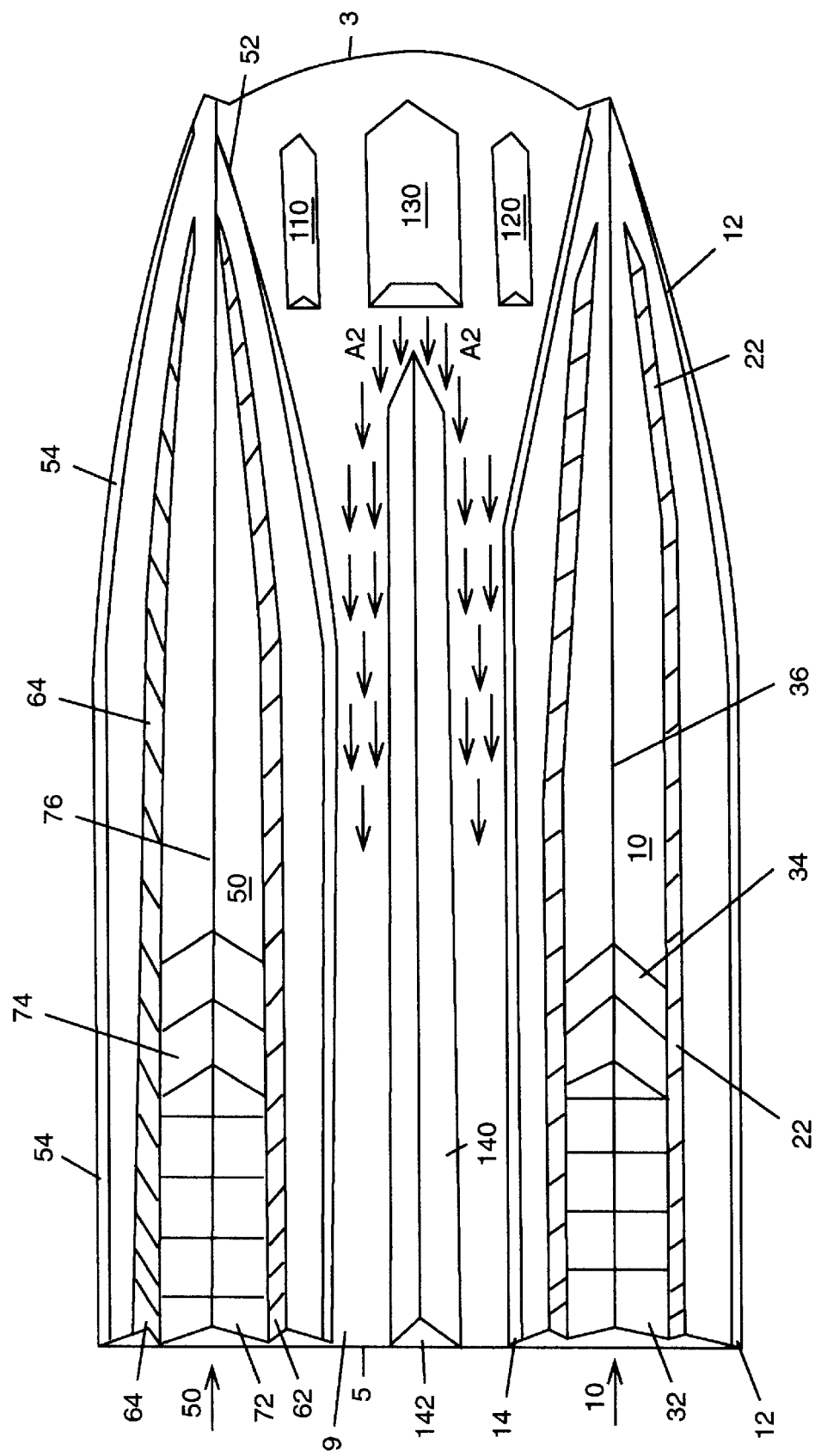
FIG. 5 shows another bottom view of FIG. 2A showing arrows A2 representing the diversion of air flow about the longitudinal stabilizer.

FIG. 5 shows another bottom view of FIG. 2A showing arrows A2 representing the diversion of air flow about the longitudinal stabilizer 140.

Figure 6:
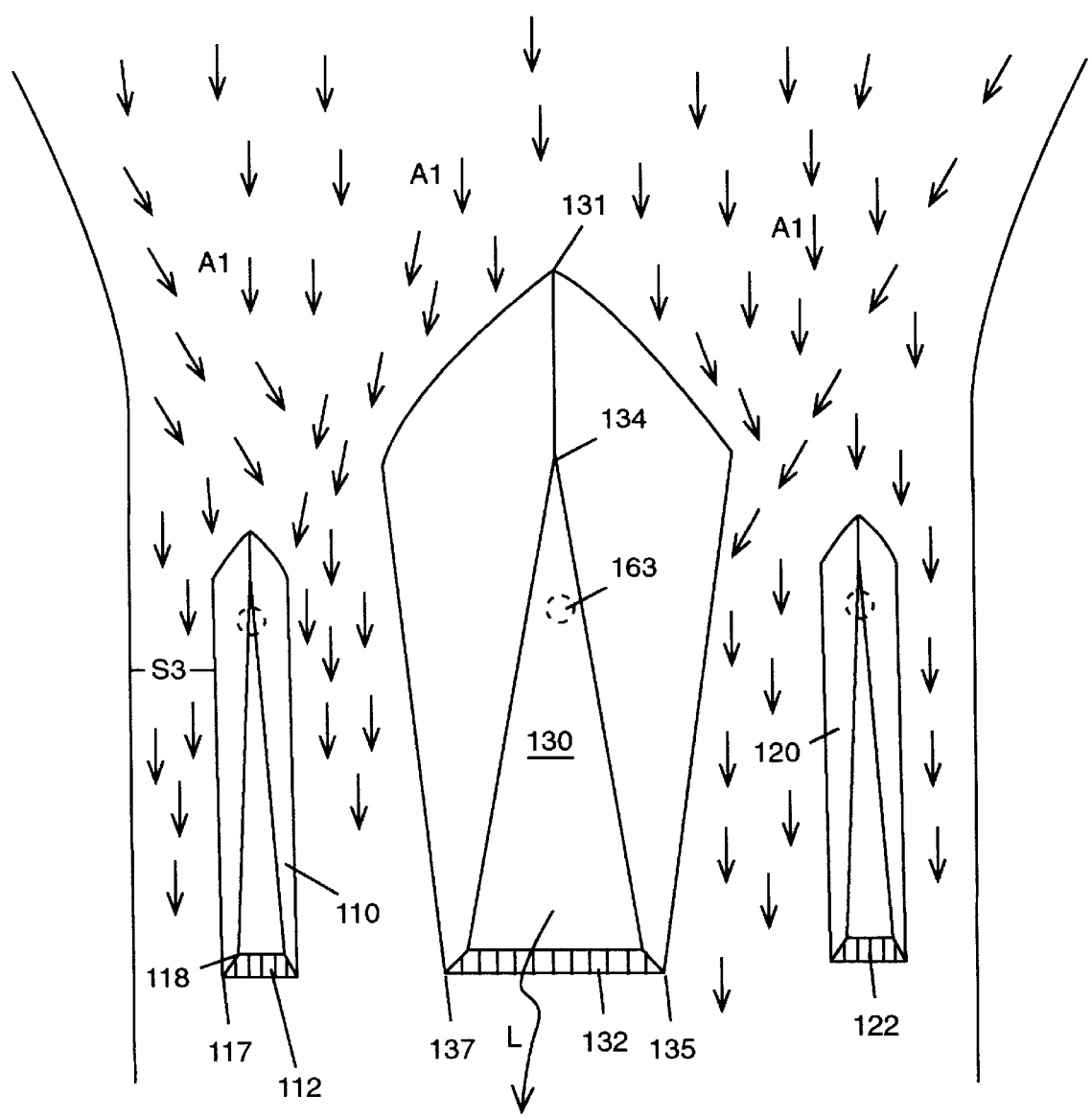
FIG. 6 shows another bottom view of FIG. 2A showing arrows A1 representing the incoming turbulent air passing through the center section and turbulent stabilizers and becoming less turbulent and indicating a laminar flow.

FIG. 6 shows another bottom view of FIG. 2A showing arrows A1 representing the incoming turbulent air passing through the center section 130 and turbulent stabilizers 110, 120 and becoming less turbulent and indicating a laminar flow.

The raised ridges on the keel pads are the interior of the lifting strokes. They add lift to the hull and funnel water to the keel pads. Lifting strokes also add in roll stability by increasing friction laterally between the two hulls and aid in directional stability due to the longitudinal ridges.

The keel pad, longitudinal turbulence stabilizer, the front section, and side stabilizers can be formed from premolds, injection molds, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A multi-hull boat comprising:
   a boat having a bow and a stern and an undersurface with a tunnel therebetween;
   a first hull along one side of the undersurface from the bow to the stern;
   a second hull parallel to the first hull and along an opposite side to the one side from the bow to the stern; and
   parallel raised protrusions on the boat undersurface of the tunnel for stabilizing turbulence caused by in-coming waves and air passing through the tunnel, the parallel raised protrusions include:

a raised front center section having a first width for forming a venturi effect;

side longitudinal raised stabilizers on each side of the center section which straighten out the incoming air and reduce the turbulence passing down the tunnel to create laminar flow; and a raised center longitudinal stabilizer running behind the center section to the rear of the boat which diverts and splits the incoming air coming to each side of the tunnel.

2. The multi-hull boat of claim 1, further comprising:

keel pads on each of the first hull and the second hull, each having raised ridges running along outer edges of each keel pad.

3. The multi-hull boat of claim 1, wherein the parallel raised surface protrusions include:

vent holes for venting excessive pressure in the tunnel to the inside of the boat.

4. A multi-hull boat comprising:

a boat having a bow and a stern and an undersurface with a tunnel therebetween;

a first hull along one side of the undersurface from the bow to the stern;

a second hull parallel to the first hull and along an opposite side to the one side from the bow to the stern;

parallel raised protrusions on the boat undersurface of the tunnel for stabilizing turbulence caused by in-coming waves and air passing through the tunnel;

the parallel raised surface protrusions include:

vent holes on the parallel raised protrusions for venting excessive pressure in the tunnel to the inside of the boat;

keel pads on each of the first hull and the second hull, each having raised ridges running along outer edges of each keel pad;

a raised front center section having a first width for forming a venturi effect; and side longitudinal raised stabilizers on each side of the center section which straighten out the incoming air and reduce the turbulence passing down the tunnel to create laminar flow.

5. The multi-hull boat of claim 4, wherein the parallel raised surface protrusions include:

a raised center longitudinal stabilizer running behind the center section to the rear of the boat which diverts and splits the incoming air coming to each side of the tunnel.

6. A multi-hull boat comprising:

a boat having a bow and a stern and an undersurface;

a first hull along one side of the undersurface from the bow to the stern;

a second hull parallel to the first hull and along an opposite side to the one side from the bow to the stern;

a front raised section between the first hull and the second hull for forming a venturi effect from incoming air;

side raised sections on each side of the front raised section which straighten out the incoming air and reduce the turbulence passing between the first hull and the second hull to create laminar flow; and a rear raised section located behind the front raised section which diverts and splits the incoming air coming between the first hull and the second hull.

* * * * *